(12) United States Patent
Painter

(10) Patent No.: US 7,097,125 B2
(45) Date of Patent: Aug. 29, 2006

(54) TAPE DRIVE WITH AUTOMATIC ADAPTATION FOR DIFFERENT SIZE TAPE CASSETTES

(75) Inventor: Dennis W. Painter, La Palma, CA (US)

(73) Assignee: Certance LLC, Scotts Valley, CA (US)

( * ) Notice: Subject to any disclaimer, the term of this patent is extended or adjusted under 35 U.S.C. 154(b) by 0 days.

(21) Appl. No.: 10/849,202

(22) Filed: May 20, 2004

(65) Prior Publication Data

US 2004/0264029 A1    Dec. 30, 2004

Related U.S. Application Data

(60) Provisional application No. 60/483,036, filed on Jun. 27, 2003.

(51) Int. Cl.
*G11B 23/04* (2006.01)

(52) U.S. Cl. ........................ 242/336; 242/352.1; 360/94

(58) Field of Classification Search ................ 242/336, 242/342, 345, 352, 352.1; 360/94
See application file for complete search history.

(56) References Cited

U.S. PATENT DOCUMENTS

| | | | |
|---|---|---|---|
| 4,787,572 A * | 11/1988 | Rademacher | 242/336 |
| 4,984,109 A * | 1/1991 | Yokoo | 360/94 |
| 5,598,984 A * | 2/1997 | Lee et al. | 242/336 |
| 5,692,695 A * | 12/1997 | Park | 242/336 |
| 5,734,520 A * | 3/1998 | Okuda et al. | 360/94 |
| 5,739,979 A * | 4/1998 | Busch | 360/94 |
| 5,873,539 A * | 2/1999 | Hong | 242/336 |
| 5,936,797 A * | 8/1999 | Suzuki | 360/94 |
| 5,954,286 A * | 9/1999 | Park et al. | 242/336 |
| 5,992,781 A * | 11/1999 | Suzuki et al. | 242/336 |
| 6,175,468 B1 * | 1/2001 | Koizumi et al. | 360/94 |
| 6,563,667 B1 * | 5/2003 | Hamabe et al. | 360/94 |

FOREIGN PATENT DOCUMENTS

JP             63-112845         *  5/1988

* cited by examiner

*Primary Examiner*—William A. Rivera
(74) *Attorney, Agent, or Firm*—Thelen Reid & Priest LLP

(57) ABSTRACT

A tape drive arrangement is configured to automatically adapt to drive different size tape cassettes and includes a sensor that senses the size of a tape cassette inserted into the tape drive. A controller is automatically responsive to the signals provided by the sensor to move drive spindles to respective different positions to drive different size tape cassettes.

10 Claims, 4 Drawing Sheets

TAPE DRIVE WITH AUTOMATIC ADAPTATION FOR DIFFERENT SIZE TAPE CASSETTES

RELATED APPLICATIONS

This Application claims priority to provisional Application 60/483,036, filed on Jun. 27, 2003, the entire disclosure of which is hereby incorporated in its entirety.

FIELD OF THE INVENTION

The present invention relates to the field of tape drives, and more particularly, to an arrangement for adapting a tape drive to different size tape cassettes having different form factors.

BACKGROUND OF THE INVENTION

The storing of large amounts of data has been accomplished by a variety of methodologies. One of the most successful of these is the use of magnetic recording tape. Tape drives have improved and over the years have increased capacity to compete with other forms of media storage technology. The ever-increasing need for storing greater amounts of data, however, maintains pressure on the tape drive industry to provide tape storage with increased capacity.

In the past, tape drives utilizing cassette loaded media have provided increased storage capacity by using media with increasing bit density and decreasing tape thickness. These measures allow for longer lengths of tape within the tape cassette. At a certain point, however, these methods are no longer feasible with existing technology so that a new tape cassette with a different form factor must be employed to replace the prior tape cassette. This creates a number of problems, but most especially the tape drive supporting the new tape cassette will be incompatible with the older tape cassettes having the previous form factor. This problem renders obsolete the media which may contain important archived data.

The above problem is especially acute since the very popular digital data storage (DDS) format is now in its fifth generation using the same form factor tape cassette. The prior capacity increases in the DDS format are based on format changes and thinner, longer tape. Employing a larger cassette with an increased amount of tape may render obsolete the DDS form factor tape cassettes that have been so prevalent.

SUMMARY OF THE INVENTION

There is a need for a tape drive that allows larger capacity tape cassettes to be employed, with increased form factors, but allows prior media, such as the DDS format tape cassettes, to still be employed in order to prevent rendering this prior media obsolete.

This and other needs are met by embodiments of the present invention which provide a tape drive configured to automatically adapt to drive different size tape cassettes. The tape drive comprises a sensor that senses the size of a tape cassette inserted into the tape drive. The tape drive also comprises moveable spindles that are responsive to the sensor to move to different respective positions to drive different size tape cassettes.

The automatic adaptation of a tape drive to different size tape cassettes allows larger tape cassettes to be employed, permitting increased tape capacity. At the same time, since the spindles are moveable in response to a sensed size of a tape cassette inserted into the tape drive, media which may contain important archived data will not be rendered obsolete.

The earlier stated needs are also met by other embodiments of the present invention which provide a method of automatically adapting a tape drive to operate with different tape cassette types having respectively different form factors. The method comprises loading a first or second tape cassette type into the tape drive. The tape cassette type of the loaded tape cassette is determined. Drive spindles are moved to position the drive spindles according to the determined tape cassette type.

The earlier stated needs are also met by other aspects of the present invention which provide a tape drive arrangement comprising a single tape guide path, and means for loading different size tape cassettes into the tape drive and adapting the tape drive to guide tape from the different size tape cassettes along the tape guide path.

The use of a single tape guide path simplifies the handling of the tape within the tape drive while still allowing tape cassettes of different size or form factors to be used in the tape drive arrangement of the invention. This increase tape capacity while maintaining backward compatibility with prior generations of media.

The foregoing and other features, aspects and advantages of the present invention will become more apparent from the following detailed description of the present invention when taken in conjunction with the accompanying drawings.

DETAILED DESCRIPTION OF THE INVENTION

The present invention addresses problems related to the increase in tape capacity of tape drives while maintaining backward compatibility with prior generations of media. This is achieved, in part, by the present invention providing a tape drive that is configured to automatically adapt to drive different size tape cassettes. In operation, the tape drive has a sensor that senses the size of a tape cassette as it is being inserted into the tape drive. The sensing may be performed either mechanically or by a non-contact method. Once the sensor senses the size of the tape cassette inserted into a tape drive, moveable spindles responsive to the sensor are moved to appropriate positions to drive the tape cassette of the sensed size. Hence, the tape drive is able adapt to different size tape cassettes, allowing larger tape cassettes to be employed, while maintaining backward compatibility with smaller size tape cassettes.

Figure 1:
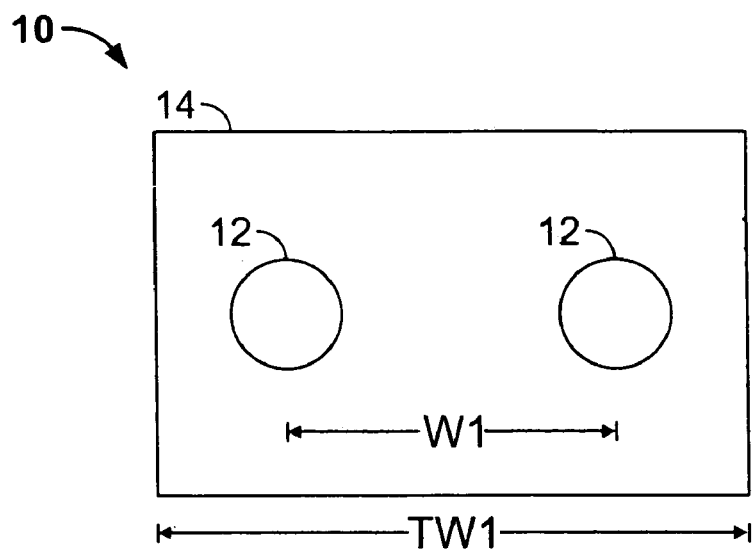
FIG. 1 is a top schematic view of a tape cassette having a first size.

FIG. 1 depicts a top view of a tape cassette 10 of a first size. An exemplary tape cassette in the digital data storage (DDS) format, having a standard form factor. For example, the first type cassette tape 10 may have a width between cassette hubs 12 of W1 and an overall width of TW1, as depicted in FIG. 1. The first type tape cassette 10 has a tape withdrawal face 14 from which tape is withdrawn, after a cassette door (not shown) is opened, as is conventional. The internal configuration of the first type cassette tape 10 may be a conventional, well-known configuration, such as those employed in DDS cassette tapes.

Figure 2:
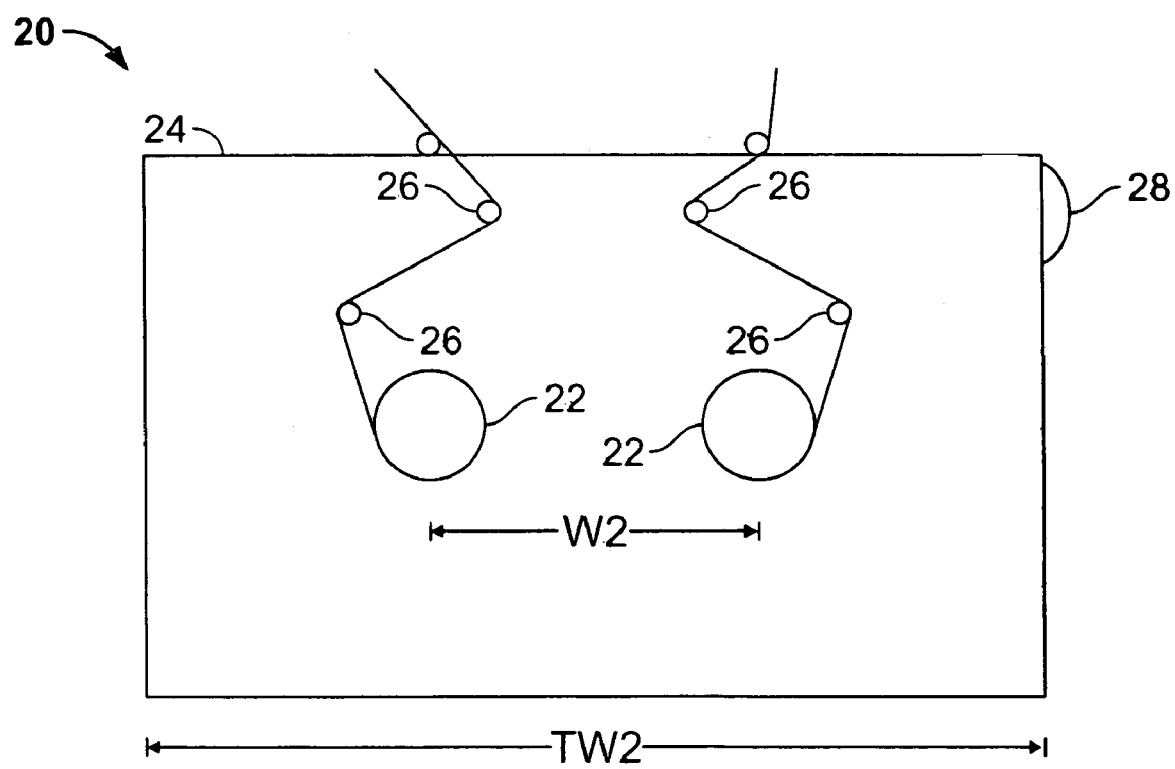
FIG. 2 is a tape cassette having a second size, larger than the first size.

FIG. 2 depicts a view similar to FIG. 1, but of a second type cassette tape 20. The second type tape cassette 20 is of a larger size than the first type tape cassette 10, as indicated by the relative sizes depicted in FIGS. 1 and 2. However, it should be noted that the figures are not necessarily drawn to scale, nor are the dimensions depicted in the drawings anything other than exemplary.

As can be seen by a comparison between FIGS. 1 and 2, the second type tape cassette tape 20 has a width W2 between cassette hubs 22 that is greater than the width W1 between the cassette hubs 12 of the first type tape cassette 10. Further, the total width TW2 of the second type tape cassette 20 is greater than TW1 of the first type tape cassette 10. Because of this different form factor, a conventional tape drive designed for the first type tape cassette 10 cannot be employed with the second type tape cassette 20. The second type tape cassette 20 has a tape withdrawal face 24 from which tape is withdrawn.

In certain embodiments of the invention, such as that depicted in FIG. 2, the second type tape cassette 20 includes a plurality of pins 26 that allow the guide path of the tape to remain the same within the tape drive irrespective of the form factor of the tape cassette. However, in other embodiments of the invention, the pins 26 are not present within the second type tape cassette 20, but rather certain pins are provided in the tape drive itself to cause the tape to be guided along the same tape guide path irrespective of the tape cassette form factor.

Also depicted in FIG. 2 is a protrusion 28 from one of the sides of the second type tape cassette 20. This protrusion 28 is present only in certain embodiments of the invention to provide a mechanical interaction with mechanical sensors that inform the tape drive that a second type tape cassette 20 has been loaded into the tape drive. In other embodiments of the invention, the protrusion 28 is not provided on the second type tape cassette 20. Also, other types of mechanical sensor interaction components may be provided on the second type tape cassette 20 instead of the protrusion 28.

Figure 3:
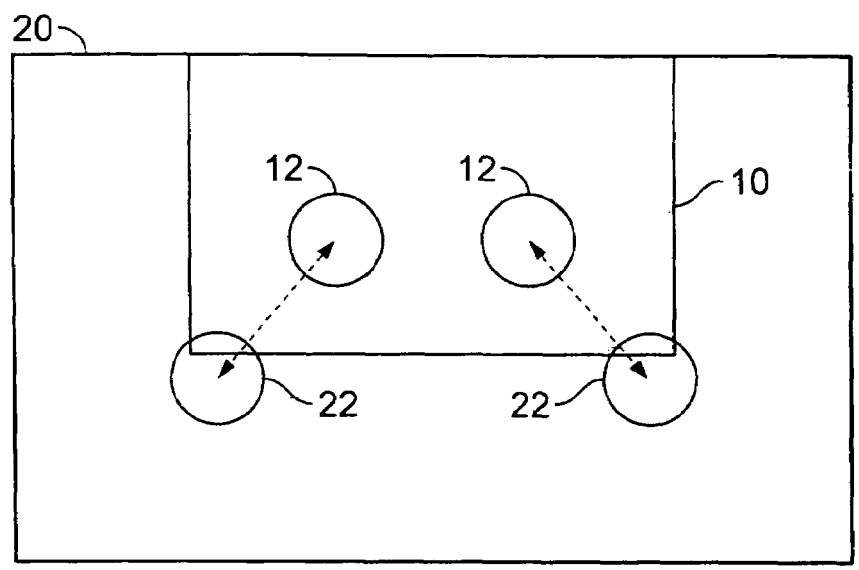
FIG. 3 is a top schematic view depicting the exemplary movement of spindles depending on the sensed size of the loaded tape cassette in accordance with embodiments of the present invention.

FIG. 3 shows the first and second type tape cassettes 10, 20 in a superimposed view to illustrate the exemplary movement of spindles of a tape drive in order to be properly positioned for tape drive operation. As can be appreciated from FIG. 3, the cassette hubs 22 are not only further apart by a distance W2–W1 than the cassette hubs 12, the cassette hubs 22 of the second type tape cassette 20 are also further from the tape withdrawal face 24. Hence, in shifting the drive spindles of a tape drive in accordance with certain embodiments of the present invention, the drive spindles need to be moveable in both the X-axis and Y-axis of the seating plane of the cassette to accommodate different size tape cassettes. The double-headed arrows of FIG. 3 indicate that the movement is made in both directions.

Figure 4:
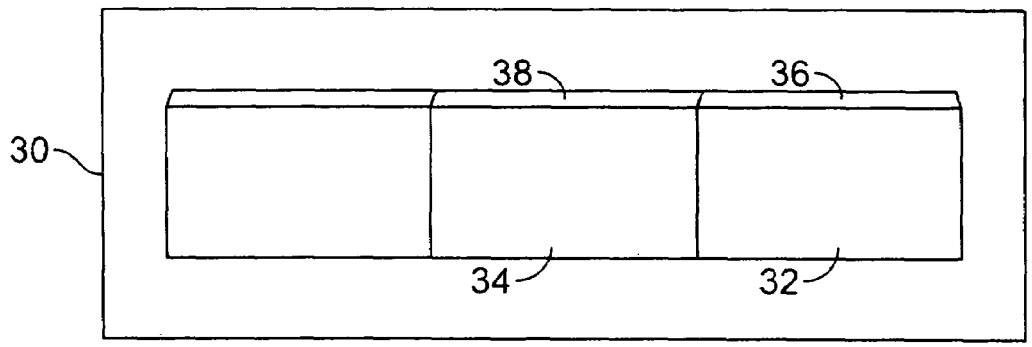
FIG. 4 is a front view of a tape drive having multiple doors for admitting different size tape cassettes into the tape drive, constructed in accordance with embodiments of the present invention.

An exemplary embodiment of a tape door arrangement is provided in FIG. 4 and should be considered exemplary only, as other embodiments of a tape door arrangement may be employed without departing from the scope of the present invention. The tape door arrangement for the tape drive 30 includes a first door 32 and a second, smaller door 34 that is located within the first door 32. Second door 34 is of a size that admits only the first type tape cassette 10, while the first door 32 is of a size that accommodates the second type tape cassette 20.

Multiple springs may be employed to allow the second door 34 to open while the first door 32 remains closed. For example, springs 36 may be provided to bias the first door 32 into a closed position. Spring 38 may be used to bias the second door 34 into a closed position. The spring constant for spring 38 may be set to be smaller than the spring constant for spring 36. Hence, pushing on the second door 34 will cause the second door 34 to rotate open while allowing the first door 32 to remain closed. A first type tape cassette 10 can therefore be inserted reliably through the second door 34.

However, when a larger tape cassette, such as the second type tape cassette 20, is to be inserted, the second type tape cassette 20 will push on the first door 32 as well as the second door 34. The pushing of the second type tape cassette 20 against both doors 32, 34 overcomes the springs 36, 38 and allows entry of the second type tape cassette 20 into the tape drive 30.

Figure 5:
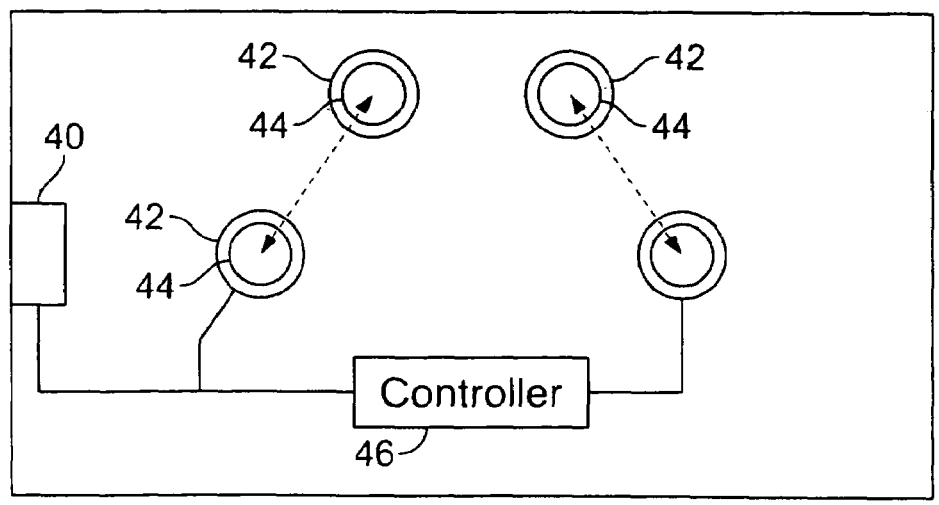
FIG. 5 is a top, schematic view depicting an exemplary embodiment of a spindle movement mechanism in accordance with embodiments of the present invention.

FIG. 5 is a schematic depiction of a spindle movement mechanism and sensor arrangement for automatically adapting the tape drive to drive different size tape cassettes 10, 20. A sensor 40 operates to sense the physical size of the first or second size tape cassettes 10, 20. A number of different sensor configurations may be employed, as know to those with skill in the art for sensing. For example, an optical sensor, which is a non-contact sensor, can be used to sense the size of the tape cassette 10, 20 that has been loaded through the tape doors 32, 34. Alternatively, a mechanical sensing arrangement may be employed that physically interacts with the tape cassette 10, 20 that has been loaded into the tape drive 30. For this purpose, for example, the protrusion 28 on the tape cassette 20, seen in FIG. 2, may interact with the sensor 40 to cause the sensor 40 to recognize that the larger, second type tape cassette 20 has been inserted.

In any event, during loading of the tape cassette 10, 20 into the tape drive 30, the sensor 40 provides a sensor signal to a controller 46 that controls the movement of a pair of drive motors 42. Firmware provided in the controller 46 controls the movements of the drive motors 42. The movement mechanism may be a conventional electro-mechanical arrangement responsive to the controller 46 to move the drive motors 42 as required.

Drive spindles 44 are direct drive spindles directly connected to the drive motors 42. Hence, when the drive motors 42 are moved, the drive spindles 44 are also moved. Drive spindles 44 are thus positioned into one of the two positions depicted in FIG. 3 depending upon the type of tape cassette 10, 20 that has been inserted into the tape drive 30 and sensed by the sensor 40. Spindles 44 are positioned after insertion of the tape cassette 10, 20, but prior to lowering of tape cassette 10, 20 onto the drive spindles. Upon the lowering of the tape cassette 10, 20 onto the drive spindles 44, the cassette door (not shown) of the tape cassette 10, 20 is opened as in a conventional manner to allow access to the tape inside the tape cassette 10, 20.

Although the illustrated embodiment depicts direct motors with attached spindles, other embodiments of the invention employ a fixed motor arrangement that drives moveable spindles. The drive to the moveable spindles can be via a gear train or a belt, for example.

Figure 6:
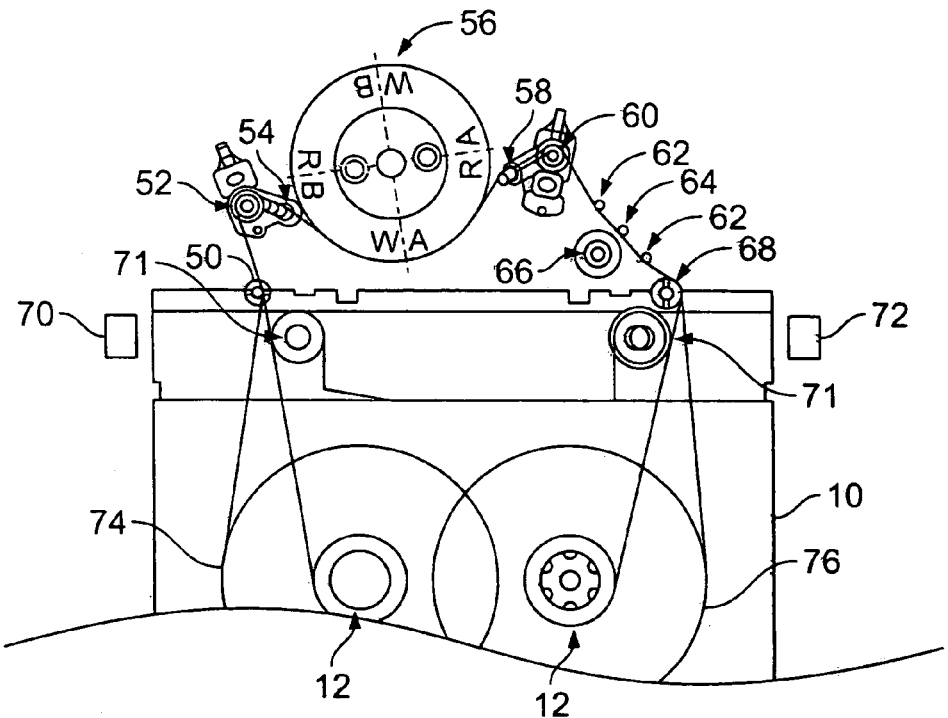
FIG. 6 shows a top view of a guide path with a first cassette type, constructed in accordance with embodiments of the present invention.
Figure 7:
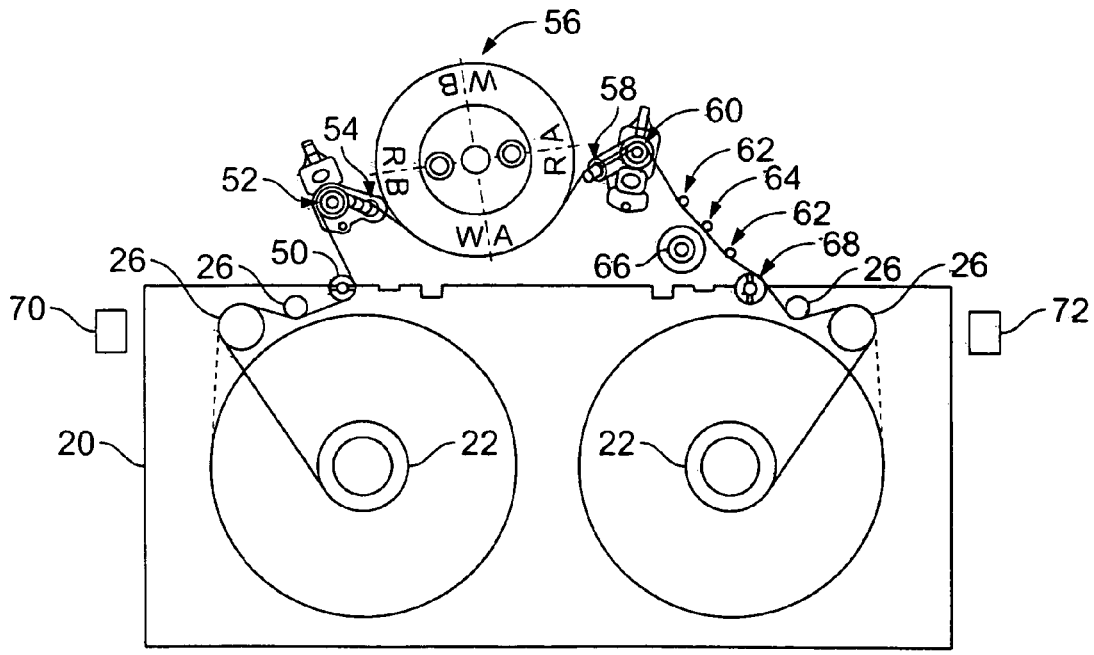
FIG. 7 shows a guide path for a larger cassette tape loaded in the tape drive of the present invention.

It is advantageous for the tape drive to have only a single tape guide path along which a tape from each of the different size tape cassettes 10, 20 is guided. This allows only a single internal set of roller posts and guide posts, as well as a single cylinder, to be used no matter the size of the tape cassette 10, 20. The tape guide path for the two different size tape cassettes 10, 20 is depicted in FIGS. 6 and 7. In FIG. 6, a guide path for the tape from the first type tape cassette 10 is depicted as being taken from a supply reel 74 and returned to a take-up reel 76. Datum pins 71 fit into the holes in the bottom of the tape cassette 10 to hold the cassette in alignment and are not part of the tape guide path. The tape is guided past a first guide post 50 over a first roller post 52 to a first inclined post 54. The tape is partially wrapped around a read/write cylinder 56.

From the read/write cylinder 56, the tape is guided past a second inclined post 58 to a second roller post 60 to a second guide post 68. One or more cap guide posts 62 may be employed to help guide the tape. A pinch roller 66 and capstan 64 are provided, as is conventional. The tape is guided from the second guide post 68 onto the take-up reel 76. An end of tape sensor 70 and a beginning of tape sensor 72 provide signals to the tape drive as to the location of the end of tape and beginning of tape respectively.

For an unloaded cassette, the tape passes from the supply reel 74 past an opening in the cassette body that places the tape very close to the inner edge of the door. The door (not seen in FIG. 6), is just above the datum pin 71. The tape runs close to the door until the tape reaches another opening in the cassette body at the take-up reel 76 of the cassette 10 where the tape enters the cassette body and wraps around the take-up reel 76. This creates an open area between two datum pins 71, the door, and the inner body of the cassette.

When a cassette is loaded, much of the tape path mechanism is retracted and positioned such that the mechanism is in the open area of the cassette 10 described above. The door over the tape is mechanically opened and once the cassette 10 is seated, a motor operates a mechanical mechanism that moves the posts and rollers to pull a tape loop out of the cassette 10 and against the cylinder 56.

As the tape in the standard cassette 10 feeds on or off of the supply reel 74 and the take-up reel 76, the shape of the cassette body itself is such that the tape is guided around the first guide post 50 and second guide post 68 at angles that correctly guide the tape into the rest of the tape path.

In order to maintain a single tape path for the tape drive 30, the larger, second type tape cassette 20 needs to provide the tape in a position that mimics the smaller, first type tape cassette 10 to maintain the feed and take-up angles within the limits of the existing tape path. For this purpose, in certain embodiments of the invention, as depicted in FIGS. 2 and 7, the second, larger type tape cassette 20 is provided with additional pins 26 that serve to guide the tape to follow the same tape path as for the first type tape cassette 10. Although shown as internal to the second type tape cassette 20, in certain embodiments of the invention, additional guide pins are provided in the tape drive 30 itself to guide the tape at proper angles relative to the first and second guide posts 50, 68. In other respects, the tape guide path is the same as for tapes of the first type tape cassette 10.

Figure 8:
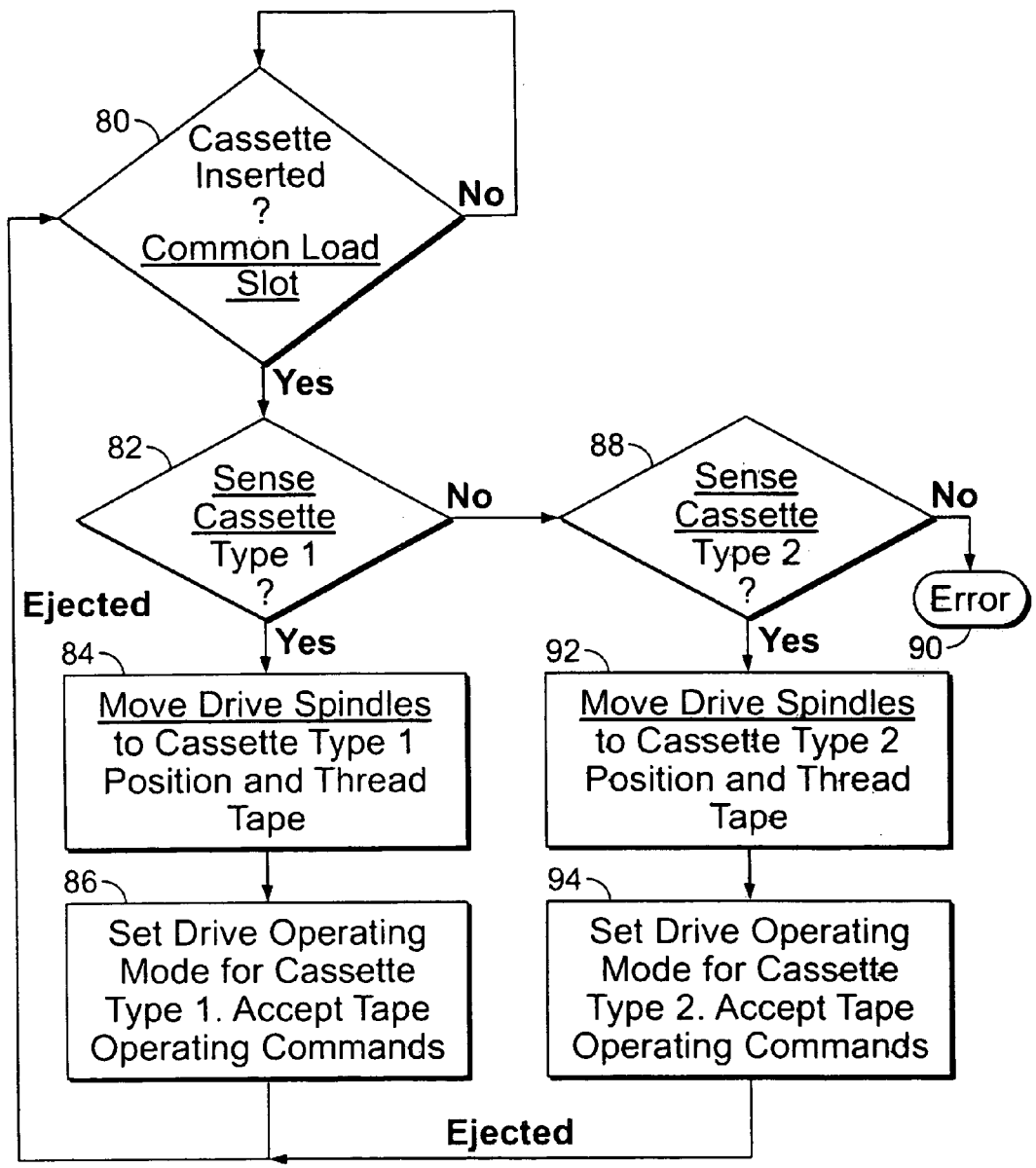
FIG. 8 is a flow diagram of the loading and tape drive process for different size tape cassettes, in accordance with embodiments of the present invention.

FIG. 8 is a basic flow diagram of a method of operating the tape drive 30 in accordance with embodiments of the present invention to adapt automatically the tape drive to drive different size tape cassettes.

In step 80, the sensor 40 determines whether a cassette has been inserted into the common load slot of the tape drive 30. If not, the process loops until it is determined that a tape cassette 10, 20 has been loaded. In step 82, it is then determined whether the cassette has been sensed as a type 1 tape cassette 10. If not, it is then determined in step 88 whether the type tape cassette is a second type tape cassette 20. If the sensor 40 has sensed neither of the first type tape cassette 10 or the second type tape cassette 20, an error 90 is returned to the controller 46.

If a first type tape cassette 10 has been determined to have been loaded in the common load slot, as determined in step 82, the drive spindles 44 are moved by the controller 46 to a type one tape cassette position and the tape is then threaded, as provided for in step 84. The drive operating mode is set by the firmware of the controller 46 for the first type tape cassette 10. Tape operating commands are then accepted, as provided for in step 86.

Assuming a second type tape cassette 20 has been inserted, as determined by step 88, the drive spindles are moved to a second type tape cassette position and the tape is started, as provided for in step 92. The drive operating mode for a second type tape cassette is set in step 94 and tape operating commands are accepted.

For both operating modes, when the operation of the tape is completed, the tape may be ejected and the process returned to step 80.

The present invention thus provides a tape drive arrangement that allows for increased capacity tape cassettes, but automatically adapts to accept tape cassette types of different form factors. This allows larger capacity tape cassettes to be employed while still providing backward compatibility to previous form factor tape cassettes. The invention therefore prevents obsolescence of media that contains important archived data.

Although the present invention has been described and illustrated in detail, it is to be clearly understood that the same is by way of illustration and example only and is not to be taken by way of limitation, the scope of the present invention being limited only by the terms of the appended claims.

What is claimed is:

1. A tape drive configured to automatically adapt to drive different size tape cassettes, comprising: a sensor that senses size of a tape cassette inserted into the tape drive; and moveable spindles that are responsive to the sensor to move to different respective positions to drive different size tape cassettes;

wherein the tape drive has only a single tape guide path along which tape from each of the different size tape cassettes is guided;

wherein the tape drive positions each of the different size tape cassettes such that a tape withdrawal face of each of the different size tape cassettes is aligned on a same line; and, wherein the moveable spindles are direct drive spindles coupled to motors, the motors being moved to the different respective positions responsive to the sensor; said tape drive further comprising a door arrangement configured with multiple doors, each door configured to accommodate a different size tape cassette wherein the multiple doors include at least a first, larger door and a second, smaller door within the first door.

2. The tape drive of claim 1, wherein the sensor is a mechanical sensor that mechanically senses the size of a tape cassette.

3. The tape drive of claim 1, wherein the sensor is a non-contact sensor that senses the size of a tape cassette in a non-contact manner.

4. A method of automatically adapting a tape drive to operate with different tape cassette types having respectively different form factors, wherein said tape drive comprises a door arrangement configured with multiple doors, each door configured to accommodate a different size tape cassette wherein the multiple doors include at least a first, larger door and a second, smaller door within the first door, the method comprising the steps: loading a tape cassette of a first or second tape cassette type into the tape drive; determining the tape cassette type of the loaded tape cassette; and moving drive spindles to position the drive spindles according to the determined tape cassette type;

further comprising lowering the loaded tape cassette onto the drive spindles after moving the drive spindles; and,
wherein the drive spindles are direct drive spindles coupled to motors, the step of moving the drive spindles including moving the motors.

5. The method of claim 4, wherein the step of determining the tape cassette type includes sensing the form factor of the tape cassette type.

6. The method of claim 5, wherein the sensing is a non-contact sensing.

7. The method of claim 4 wherein the sensing is a mechanical sensing by physical interaction with the tape cassette.

8. The method of claim 4, wherein each tape cassette type is lowered to a position such that a tape withdrawal face of each of the different tape cassette types is aligned on a same line.

9. The method of claim 8, further comprising pulling tape out of the tape cassette and guiding the tape on a guide path external to the tape cassette, after the lowering of the loaded tape cassette onto the drive spindles.

10. The method of claim 9, wherein the guide path is identical for each of the different tape cassette types.

* * * * *